March 5, 1968

H. F. TURGETTO 3,371,943

COLLAPSIBLE TUMBLING WHEEL

Filed March 9, 1966

INVENTOR
Herman F. Turgetto
BY Polachek & Saulsbury
ATTORNEYS

March 5, 1968 H. F. TURGETTO 3,371,943
COLLAPSIBLE TUMBLING WHEEL
Filed March 9, 1966 2 Sheets-Sheet 2
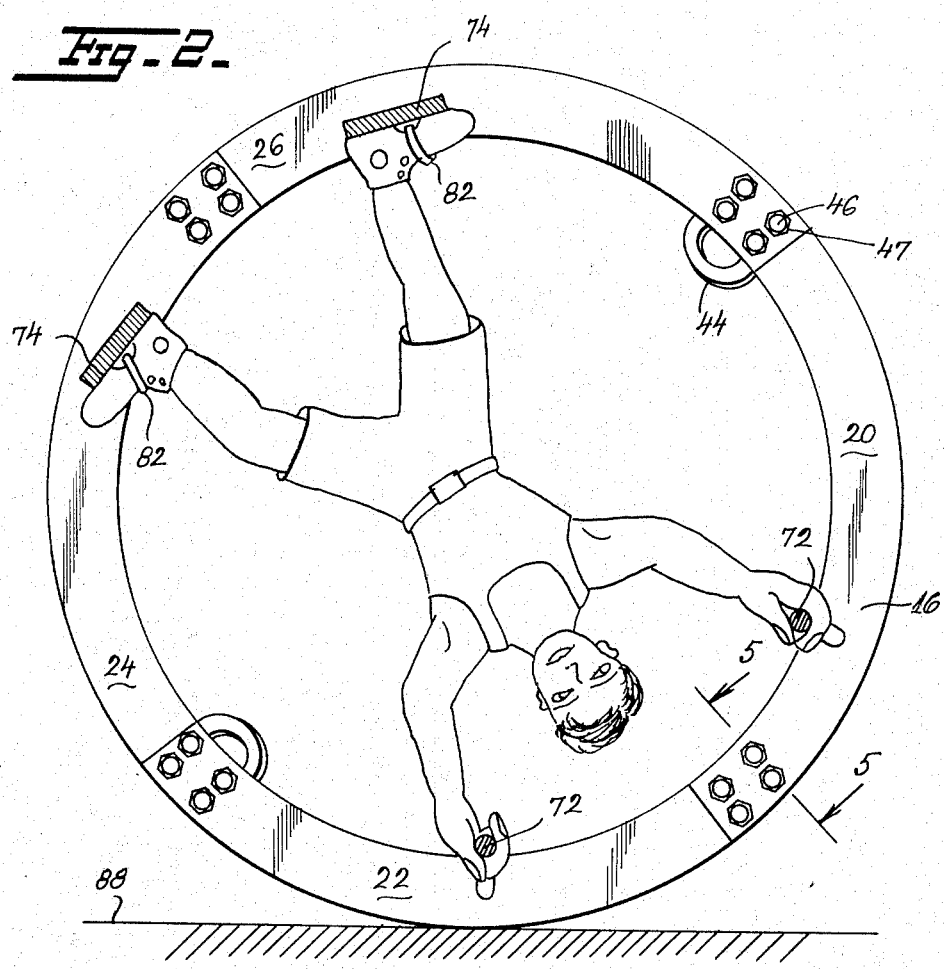
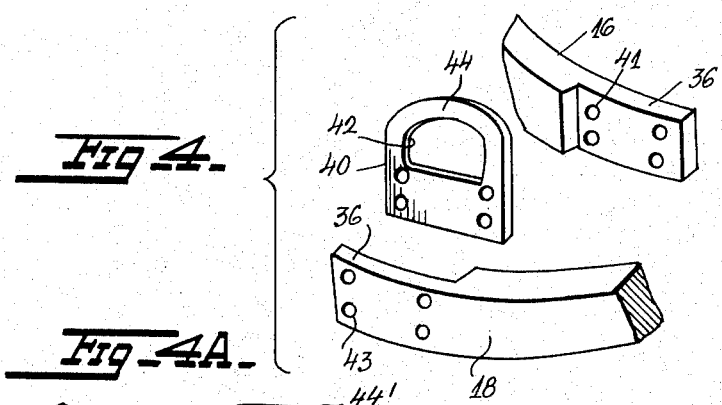
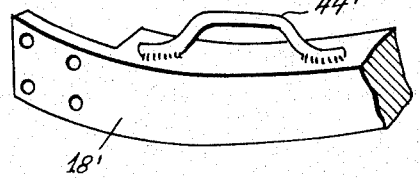
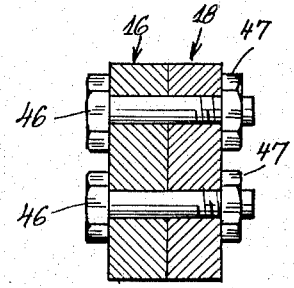
INVENTOR
Herman F. Turgetto
BY Polachek & Saulsbury
ATTORNEYS

United States Patent Office 3,371,943
Patented Mar. 5, 1968

3,371,943
COLLAPSIBLE TUMBLING WHEEL
Herman F. Turgetto, 57—23 Catalpa Ave.,
Ridgewood, N.Y. 11227
Filed Mar. 9, 1966, Ser. No. 533,076
5 Claims. (Cl. 280—206)

ABSTRACT OF THE DISCLOSURE

This invention relates generally to certain new and useful improvements in an occupant-propelled tumbling and rolling apparatus through the medium of which the occupant is given exercise.

The apparatus has an open-work frame or wheel characterized by a pair of coplanar axially aligned hoops or rings, means for joining the rings rigidly together and means in the space between the hoops for accommodating the occupant in a stretched position.

---

An important object of the invention is to provide an open-work frame or wheel characterized by a pair of coplanar axially aligned hoops or rings, means for joining the rings rigidly together and means in the space between the hoops for accommodating the occupant in a stretched position.

Yet another object of the invention is to provide apparatus of this kind which completely surrounds the occupant and protects the occupant from injury.

Still another object of the invention is to provide an improved physical exercising apparatus of the rocking, rolling and tumbling type, said apparatus being inexpensive to manufacture, durable in construction, easy to assemble, readily collapsible and relatively light in weight so that it can be readily transported or stored and being provided with means for safely securing the occupant therein so that the occupant will be entirely protected by the framework of the apparatus during its use.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIG. 2 is a vertical sectional view taken on the plane of the line 2—2 of FIG. 1 illustrating how the occupant is positioned therein and uses it in loop-the-loop fashion or otherwise.

FIG. 4 is a spread perspective view of a joint between the hoop sections.

FIG. 4a is a perspective view of a modified form of a hand grip, and

FIG. 5 is an enlarged sectional view taken on the plane of the line 5—5 of FIG. 2.

Figure 1:
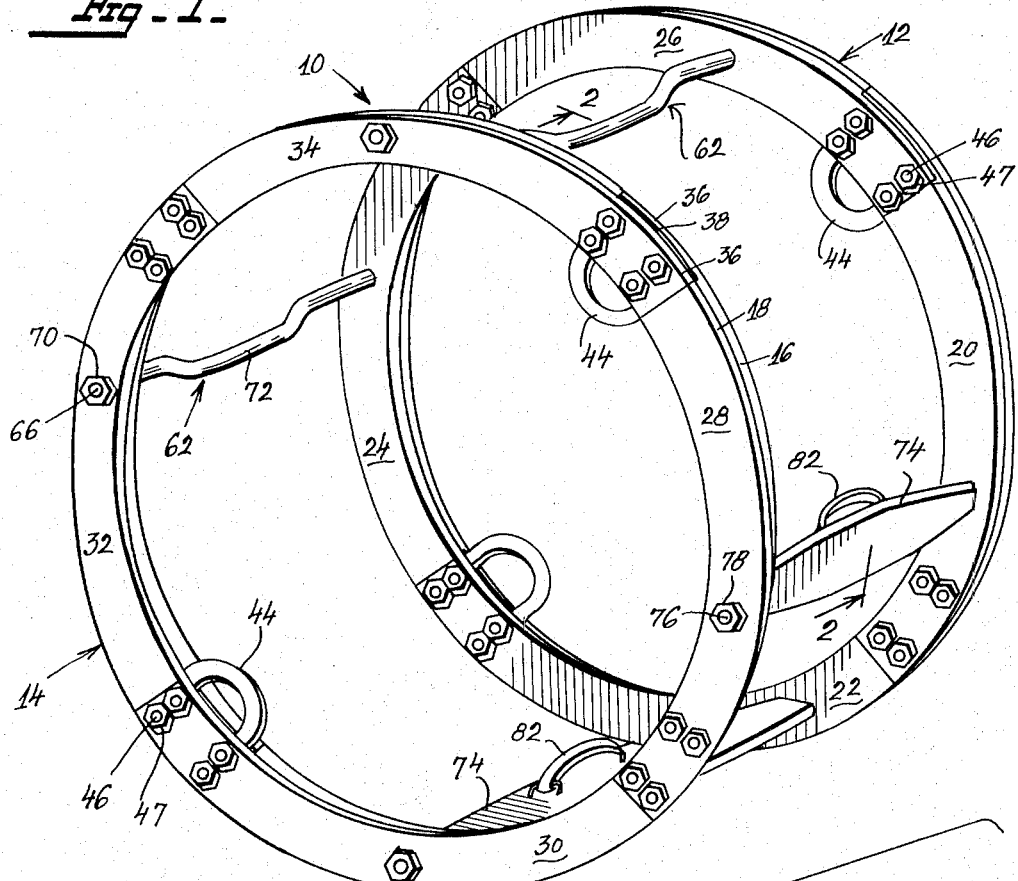
FIGURE 1 is a perspective view of the occupant-propelled tumbling and rolling apparatus embodying the invention illustrating how it is constructed.
Figure 3:
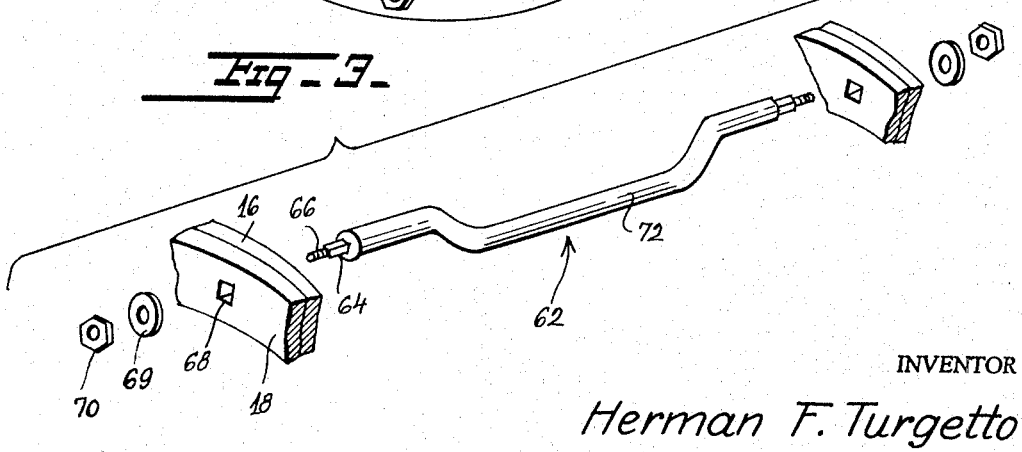
FIG. 3 is a spread perspective view of combined handle bar and tie bar and mounting therefor.

Referring now in detail to the various views of the drawings, in FIG. 1, there is illustrated occupant-propelled tumbling and rolling apparatus embodying the invention which apparatus is designated generally at 10. The apparatus 10 includes two duplicate rings or hoops 12 and 14 of light weight metal such as aluminum. These are disposed in side-by-side relationship and are fixedly connected together in this relationship to provide an open work frame structure or wheel structure.

Each ring or hoop is sectional and is composed of two juxtaposed ring members 16 and 18, the ring member 16 being composed of four sections 20, 22, 24, 26 and the ring member 18 being composed of four sections 28, 30, 32, 34. Each section is reduced in thickness at one end thereof as indicated at 36. In assembling, the ends 36 with the reduced thickness are placed side by side thereby forming a narrow space 38 therebetween. In each space 38, there is a substantially rectangular shaped perforated plate 40 formed with an arcuate-shaped end and transverse slot 42 providing a crosspiece 44 serving as a hand grip for the occupant. The plates 40 and the sections of the ring members 16 and 18 are fixed in position by pairs of bolts 46 and nuts 47 assemblies passing through the perforations in the plates and through aligned holes 41 and 43 in the ring members 16 and 18, respectively.

One means utilized in bringing about the companion cooperative spaced relationship between the hoops is a pair of round bars 62, 62. The ends of the bars are reduced in diameter and squared as indicated at 64, continuing into a further reduced portion and externally screw threaded terminals 66. Each squared portion 64 extends through aligned square holes 68 in the juxtaposed ring members 16 and 18, leaving the threaded terminals 66 protruding outwardly of the hoops. Lock nuts 70 are threaded onto the threaded terminals 66 with washers 69 interposed between the wing nuts and adjacent ring members 18. The bars 62 are offset midway the ends thereof as indicated at 72. By reason of this construction, the bars 62 are readily assembled and disassembled and provide convenient handle bars.

Another means utilized for spacing the hoops from each other and holding them in spaced relation is a pair of foot boards 74, 74 tapering at their ends. The ends of the boards 74 are shaped similarly to the ends of the bars 62, 62 having squared portions receivable in square holes in the ring members 16 and 18 and having threaded terminals 76 protruding outwardly of the ring member 18 to receive nuts 78. Looped leather straps 82 are suitably fastened to the inner surface of the boards 74.

In operation, an occupant can assume a starting position by inserting his feet through the straps 82 of the foot boards 74 and standing erect and grasping the handle bars 62 with his hands as seen in FIG. 2, or by grasping hand grips 44' welded to the inner peripheries of the rings 18' as shown in FIG. 4A. The occupant can now start the apparatus rolling or rocking by shifting his body weight laterally by exerting pressure against the handle bars 62 and foot straps 82 and thus by overbalance cause the apparatus to start its rolling or rocking motion on the ground 88. In continuing the rolling motion, the occupant's body will be rotated through a head-down position and then back to the starting position with his head erect at the completion of one revolution.

The hand grips 44 are used for changing direction when rocking or tumbling by merely exerting pressure on such hand grips by the hands of the occupant. By reason of this construction, the occupant can easily gain the rhythm and balance necessary to rock farther and farther, and it is the best fun after the necessary balance and rhythm for smoothness of operation have been acquired. Furthermore, in order to obtain the effect or thrill of the tumbling action of such apparatus, it is not necessary for the rider to obtain any significant speed. Due to the protective frame the occupant is never exposed to contact with the ground, being held by the foot straps 82 and the hand grips 72 and having a reliable control of the movement of the apparatus by being able to shift the weight of his body as desired.

The apparatus is light in weight and can be readily assembled and disassembled and the various elements can be stacked together to form a relatively compact package which is easy to transport or store.

While I have illustrated and described the preferred embodiments of my invention it is to be understood that I do not limit myself to the precise constructions herein disclosed and that various changes and modifications may be made within the scope of the invention as defined in the appended claims.

What is claimed is:

1. An exercising and amusement apparatus comprising a pair of spaced parallel endless hoops of prescribed and identical diameter, a pair of bars bridging the space between the respective hoops in spaced relationship and detachably connected to the hoops, said bars serving as handle bars for grasping by the hands of the occupant, a pair of foot boards bridging the space between the respective hoops in spaced relationship and detachably connected to the hoops, and means attached to the boards for holding the feet of the occupant against displacement, said hoops being sectional including a pair of juxtaposed ring members bolted to each other, each ring member divided into at least four sections.

2. An exercising and amusement apparatus comprising a pair of spaced parallel endless hoops of prescribed and identical diameter, a pair of bars bridging the space between the respective hoops in spaced relationship and detachably connected to the hoops, said bars serving as handle bars for grasping by the hands of the occupant, a pair of foot boards bridging the space between the respective hoops in spaced relationship and detachably connected to the hoops, and means attached to the boards for holding the feet of the occupant against displacement, the bars being offset midway the ends thereof, the hoops having spaced square holes therealong the detachable connection between the bars and hoops including square portions at the ends of the bars extending through said square holes, said square portions continuing into round externally screw threaded terminals extending outwardly of the hoops, and nuts on the protruding terminals.

3. The exercising and amusement apparatus as defined in claim 2, wherein the detachable connection between the foot boards and hoops include square portions at the ends of the bars extending through the square holes in the hoops, said square portions continuing into round externally screw threaded terminals extending outwardly of the hoops, and nuts on the protruding terminals.

4. The exercising and amusement apparatus as defined in claim 3, wherein the means for holding the feet of the occupant includes leather straps secured to the inner surface of the foot boards, said straps having loops to receive the feet of the occupant.

5. The exercising and amusement apparatus as defined in claim 2, characterized by looped hand grips spaced around and depending from the inner periphery of the hoops for exerting body pressure on the hoops.

References Cited

UNITED STATES PATENTS

| | | | |
|---|---|---|---|
| 1,317,105 | 9/1919 | Roller | 301—30 |
| 1,676,015 | 4/1928 | Feick | 280—206 |
| 3,083,037 | 3/1963 | Gordon et al. | 280—206 |
| 3,156,486 | 11/1964 | Fenwick | 280—206 |

KENNETH H. BETTS, *Primary Examiner.*